Feb. 20, 1934.   G. A. LYON   1,948,272
RING CONSTRUCTION FOR ORNAMENTING RIMS
Filed Jan. 15, 1932
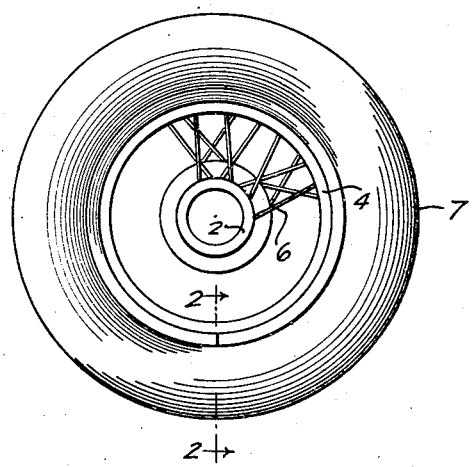
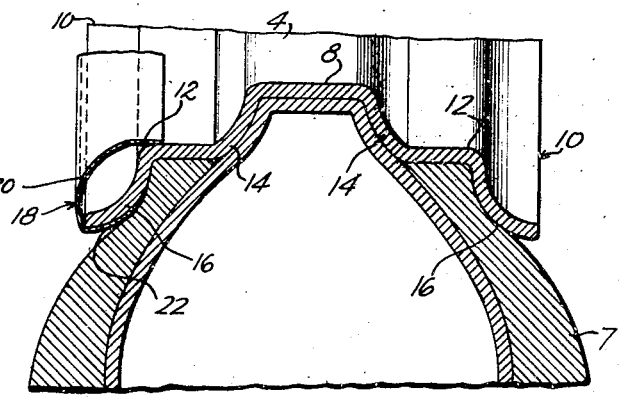
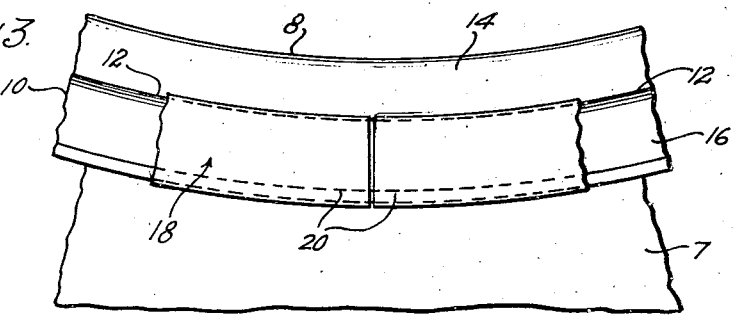
INVENTOR
GEORGE ALBERT LYON
BY HIS ATTORNEYS Patented Feb. 20, 1934

1,948,272

UNITED STATES PATENT OFFICE 1,948,272

RING CONSTRUCTION FOR ORNAMENTING RIMS

George Albert Lyon, Allenhurst, N. J.

Application January 15, 1932. Serial No. 586,913

7 Claims. (Cl. 41—10)

This invention relates to rings adapted to be applied to the rims of automobile wheels to give the same an attractive appearance.

A ring construction has been devised for ornamenting rims of automobile wheels in which a ring of relatively thin sheet metal has been constructed with spaced flanges forming an annular recess to receive the marginal portion of a rim flange. The ring is slipped over the marginal portion of a rim flange with the said marginal portion engaging in said recess, and the ring is held in position on the rim by the resilience of the metal. The present invention relates to a ring construction of this general type for ornamenting rims.

The principal object of the invention is to improve the construction and mode of operation of rings of the general type referred to above for ornamenting rims, and to produce a construction which may be very easily and quickly applied to a rim, and which will be securely held in position at all times.

With the above and other objects in view, a construction has been produced which may be readily applied to a rim flange by simple manual operations without tapping or hammering the ring. In the form of the invention shown in the present application one of the flanges on the ring is engaged by the tire when the latter is inflated, thereby exerting a pressure on said flange which tends to hold the ring in position. The construction of the ring however is such that it will be still held securely in place by its engagement with the rim flange when the tire is deflated.

The features of the invention will be clearly understood from the accompanying drawing illustrating the invention in its preferred form, and the following detailed description of the constructions therein shown.

In the drawing—

Figure 1 is a view in side elevation illustrating an automobile wheel, to the rim of which a ring embodying the present invention is applied, the wheel being shown with a tire mounted thereon;

Figure 2 is a view in transverse section taken substantially on the line 2—2 of Figure 1; and Figure 3 is a detail view in side elevation illustrating portions respectively of the wheel, tire and ornamental ring.

The invention is illustrated in this application as applied to the rim of a wire wheel for automobiles, such as those used upon the Ford and Chevrolet. The wire wheel shown in the drawing comprises a hub 2, a rim 4, a series of spokes 6 connecting the hub with the rim. The drawing shows a tire 7 mounted on the rim.

The rim has the shape in transverse cross section illustrated in Fig. 2. As shown in said figure the rim comprises a base indicated at 8 and side flanges 10 extending outwardly from said base. Each of the rim flanges is provided with an annular shoulder indicated at 12, and with a portion 14 between the base and the shoulder 12 which is concavo-convex in cross section, as shown in Fig. 2. The portion 16 of each rim flange extending outwardly beyond the corresponding shoulder 12 also is concavo-convex in cross section.

The construction for ornamenting the rim consists of a split ring indicated at 18 adapted to be applied to the outer portion of one of the rim flanges. This ornamental ring 18 preferably has substantially the shape in cross section illustrated in Fig. 2. As shown in this figure, the ring is provided with a flange 20 having a concavo-convex cross section and arranged to overlie the outer surface of the rim flange, and with a flange 22 also having a concavo-convex cross section to correspond with the cross-sectional shape of the outer portion of the rim flange. These flanges 20 and 22 are arranged in spaced relation providing an annular recess between them to receive the marginal portion of the rim flange. The inner marginal portion of the flange 20 is extended in a direction substantially parallel with the axis of the ring so as to engage the inner face of the shoulder 12 on the rim flange, as clearly shown in Fig. 2. The flanges 20 and 22 normally lie in such spaced relation to each other when the ring is off the rim that said ring flanges must be forced apart to a certain degree in applying the ring to the rim flange. The springing apart of the flanges may be readily accomplished upon forcing the ring manually into position on the rim flange without tapping or hammering the ring.

It will be noted from an inspection of Fig. 2 that the flange 22 of the ring is engaged by the tire when the tire is inflated and the pressure of the tire on this flange assists in holding the ring securely in position. When the tire is deflated, as in case of a puncture or blowout, the engagement of the marginal portion of the flange 22 with the inner face of the shoulder 12 will hold the ring from being thrown off the rim by centrifugal force.

The ornamental ring 18 is preferably made of thin gauge sheet metal having a high degree of resilience and of a character which resists corrosion, and may be given a high polish. For example, this ring may be made from a strip of stainless sheet steel, or sheet brass, having a gauge of .030 of an inch. The strip is shaped or bent into the form of a split ring having a normal diameter somewhat less than the diameter of the corresponding portion of the rim flange over which it fits, and is expanded radially against the spring of the material in placing the same in position. The ring is so formed that the end portions thereof will lie in aligned and preferably slightly spaced relation when the ring is applied to the rim flange.

The ornamental ring 18 is preferably applied to the rim by first applying one end of the ring to the rim flange and then working the ring progressively over the rim flange into operating position. During this operation not only are the flanges 20 and 22 sprung apart to a certain degree, but the ring as a whole is radially expanded. When in position, the resilience of the material from which the ring is formed tends, with considerable force, to contract the ring, and the ring is held in position primarily by this contracting force which causes it to grip securely the rim flange.

It is to be understood that the invention may be embodied in ornamental rings adapted to be applied to rims having different cross-sectional shapes from that illustrated in the drawing of this application. It is also to be understood that the invention is not limited to the particular construction and arrangement of parts of the illustrated embodiment of the invention but that the invention may be embodied in other forms within the scope of the claims.

Having explained the nature and object of the invention, and having specifically described a construction embodying the invention in its preferred form, what is claimed is:

1. A construction for ornamenting rims comprising a ring having spaced inner and outer flanges arranged to embrace the marginal portion of a rim flange, the outer flange of the ring being wider than the inner flange and having its inner margin arranged to engage the rim flange at some distance from the margin of the latter to hold the ring from being thrown from the rim by centrifugal force.

2. A construction for ornamenting rims comprising a ring having spaced inner and outer flanges concavo-convex in cross section, and each having its convex surface on the outside thereof, said flanges being arranged to embrace the marginal portion of a rim flange and the inner flange of the ring being arranged to engage a shoulder on the rim flange.

3. A construction for ornamenting rims comprising a ring having spaced inner and outer flanges arranged to embrace the marginal portion of a rim flange, the inner flange being concavo-convex in cross section and spaced from the rim flange for some distance inwardly from the outer margin of said rim flange and arranged to engage the inner face of a shoulder on the rim flange at some distance from said margin.

4. A construction for ornamenting rims of the type having a base, an annular shoulder on each rim flange between the base and the outer margin thereof, and portions concavo-convex in cross section respectively between the base and said shoulder and between said shoulder and the outer margin, said construction comprising a ring having spaced flanges arranged to embrace the marginal portion of the rim flange and having the marginal portion of the inner ring flange arranged to engage the inner face of said shoulder.

5. A construction for ornamenting rims of the type having a base, an annular shoulder on each rim flange between the base and the outer margin thereof, and portions concavo-convex in cross section respectively between the base and said shoulder and between said shoulder and the outer margin, said construction comprising a ring having an outer flange concavo-convex in cross section to fit the outer margin of the rim flange, and an inner flange concavo-convex in cross section and spaced from the rim flange for some distance inwardly from the outer margin of the latter and having the marginal portion of said ring flange arranged to engage the inner face of said shoulder.

6. A construction for ornamenting rims comprising a ring having spaced inner and outer flanges arranged to embrace the marginal portion of a rim flange, the outer flange of the ring being wider than the inner flange and having its inner margin arranged to engage the rim flange at some distance from the margin of the latter to hold the ring from being thown from the rim by centrifugal force, said ring being split and of a normal diameter slightly less than the diameter of said marginal portion of rim flange over which it fits and being expandible radially against the spring of the material in the placing of same in position on the rim flange.

7. A construction for ornamenting rims comprising a ring having spaced inner and outer flanges concavo-convex in cross section, and each having its convex surface on the outside thereof, said flanges being arranged to embrace the marginal portion of a rim flange and the inner flange of the ring being arranged to engage a shoulder on the rim flange, said ring being split so that it may be sprung in place on said rim flange and said flanges of the ring being formed resilient so that they may be sprung apart as they are fitted over said rim flange.

GEORGE ALBERT LYON.